United States Patent
Gariel et al.

(10) Patent No.: US 12,459,666 B2
(45) Date of Patent: Nov. 4, 2025

(54) SIDESTRIPE IDENTIFICATION, ESTIMATION AND CHARACTERIZATION FOR ARBITRARY RUNWAYS

(71) Applicant: Joby Aero, Inc., Santa Cruz, CA (US)

(72) Inventors: Maxime Marie Christophe Gariel, San Francisco, CA (US); Alexander Amin Hamid Bridi, Reston, VA (US); Robert Eugene Johnston Timpe, Burlingame, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 310 days.

(21) Appl. No.: 18/118,452

(22) Filed: Mar. 7, 2023

(65) Prior Publication Data

US 2024/0300666 A1    Sep. 12, 2024

(51) Int. Cl.
| | | |
|---|---|---|
| *G06V 20/64* | (2022.01) | |
| *B64D 45/08* | (2006.01) | |
| *G06T 7/215* | (2017.01) | |
| *G06T 7/246* | (2017.01) | |
| *G06V 10/774* | (2022.01) | |
| *G06V 20/17* | (2022.01) | |

(52) U.S. Cl.
CPC .............. *B64D 45/08* (2013.01); *G06T 7/215* (2017.01); *G06T 7/246* (2017.01); *G06V 10/774* (2022.01); *G06V 20/17* (2022.01); *G06V 20/647* (2022.01); *G06T 2207/10036* (2013.01)

(58) Field of Classification Search
CPC ...... B64D 45/08; G06V 20/17; G06V 20/647; G06V 10/764; G06V 10/82
See application file for complete search history.

(56) References Cited

U.S. PATENT DOCUMENTS

| | | | |
|---|---|---|---|
| 3,035,789 A | 5/1962 | Young | |
| 4,022,405 A | 5/1977 | Peterson | |
| 5,823,468 A | 10/1998 | Bothe | |
| (Continued) | | | |

FOREIGN PATENT DOCUMENTS

| | | | | |
|---|---|---|---|---|
| CN | 112288879 A | * | 1/2021 | |
| CN | 112904895 A | * | 6/2021 | ............. G05D 1/101 |
| (Continued) | | | | |

OTHER PUBLICATIONS

Nazir et al., "Vision Based Autonomous Runway Identification and Position Estimation for UAV Landing," 2018 International Conference on Artificial Intelligence and Data Processing (IDAP), 2018, pp. 1-6. (Year: 2018).*

(Continued)

*Primary Examiner* — Dino Kujundzic
(74) *Attorney, Agent, or Firm* — Dority & Manning, P.A.

(57) ABSTRACT

Various embodiments of an apparatus, methods, systems and computer program products described herein are directed to an Identification Engine. The Identification Engine identifies a portrayal in image data of at least one side stripe of an aircraft runway at a geographical location. The Identification Engine applies a three-dimensional (3D) map of the geographic location to the portrayal of the at least one side strip in the image data. Based on applying the 3D map, the Identification Engine determines a current position of an aircraft in the 3D map with respect to the aircraft runway at the geographical location.

20 Claims, 8 Drawing Sheets

(56) References Cited

U.S. PATENT DOCUMENTS

| | | | |
|---|---|---|---|
| 5,839,691 A | 11/1998 | Lariviere | |
| 5,842,667 A | 12/1998 | Jones | |
| 6,157,876 A * | 12/2000 | Tarleton, Jr. | G05D 1/0676 |
| | | | 342/63 |
| 6,343,127 B1 | 1/2002 | Billoud | |
| 6,892,980 B2 | 5/2005 | Kawai | |
| 8,016,226 B1 | 9/2011 | Wood | |
| 8,020,804 B2 | 9/2011 | Yoeli | |
| 8,311,686 B2 | 11/2012 | Herkes et al. | |
| 8,733,690 B2 | 5/2014 | Bevirt et al. | |
| 8,737,634 B2 | 5/2014 | Brown et al. | |
| 8,849,479 B2 | 9/2014 | Walter | |
| 9,205,930 B2 | 12/2015 | Yanagawa | |
| 9,387,928 B1 | 7/2016 | Gentry et al. | |
| 9,415,870 B1 | 8/2016 | Beckman et al. | |
| 9,422,055 B1 | 8/2016 | Beckman et al. | |
| 9,435,661 B2 | 9/2016 | Brenner et al. | |
| 9,442,496 B1 | 9/2016 | Beckman et al. | |
| 9,550,561 B1 | 1/2017 | Beckman et al. | |
| 9,569,668 B2 * | 2/2017 | Schertler | G06V 20/182 |
| 9,663,237 B2 | 5/2017 | Senkel et al. | |
| 9,694,911 B2 | 7/2017 | Bevirt et al. | |
| 9,771,157 B2 | 9/2017 | Gagne et al. | |
| 9,786,961 B2 | 10/2017 | Dyer et al. | |
| 9,802,702 B1 | 10/2017 | Beckman et al. | |
| 9,816,529 B2 | 11/2017 | Grissom et al. | |
| 9,838,436 B2 | 12/2017 | Michaels | |
| 10,001,376 B1 * | 6/2018 | Tiana | G01C 21/005 |
| 10,140,873 B2 | 11/2018 | Adler et al. | |
| 10,152,894 B2 | 12/2018 | Adler et al. | |
| 10,216,190 B2 | 2/2019 | Bostick et al. | |
| 10,249,200 B1 | 4/2019 | Grenier et al. | |
| 10,304,344 B2 | 5/2019 | Moravek et al. | |
| 10,330,482 B2 | 6/2019 | Chen et al. | |
| 10,593,215 B2 | 3/2020 | Villa | |
| 10,593,217 B2 | 3/2020 | Shannon | |
| 10,752,365 B2 | 8/2020 | Galzin | |
| 10,759,537 B2 | 9/2020 | Moore et al. | |
| 10,768,201 B2 | 9/2020 | Luo et al. | |
| 10,793,286 B1 * | 10/2020 | Carrico | G05D 1/0088 |
| 10,832,581 B2 | 11/2020 | Westervelt et al. | |
| 10,836,470 B2 | 11/2020 | Liu et al. | |
| 10,913,528 B1 | 2/2021 | Moore et al. | |
| 10,948,910 B2 | 3/2021 | Taveira et al. | |
| 10,960,785 B2 | 3/2021 | Villanueva et al. | |
| 11,130,566 B2 | 9/2021 | Mikic et al. | |
| 11,145,211 B2 | 10/2021 | Goel et al. | |
| 11,238,745 B2 | 2/2022 | Villa et al. | |
| 11,295,622 B2 | 4/2022 | Goel et al. | |
| 11,532,237 B2 * | 12/2022 | Tiana | G01C 3/14 |
| 11,783,575 B2 * | 10/2023 | Billhartz | G06F 18/2431 |
| 12,148,183 B2 * | 11/2024 | Evans | G08G 5/21 |
| 2010/0079342 A1 | 4/2010 | Smith et al. | |
| 2014/0179535 A1 | 6/2014 | Stückl et al. | |
| 2016/0093225 A1 * | 3/2016 | Williams | G06V 20/176 |
| | | | 701/17 |
| 2016/0311529 A1 | 10/2016 | Brotherton-Ratcliffe et al. | |
| 2017/0197710 A1 | 7/2017 | Ma | |
| 2017/0357914 A1 | 12/2017 | Tulabandhula et al. | |
| 2018/0018887 A1 | 1/2018 | Sharma et al. | |
| 2018/0053425 A1 | 2/2018 | Adler et al. | |
| 2018/0216988 A1 | 8/2018 | Nance | |
| 2018/0308366 A1 | 10/2018 | Goel et al. | |
| 2018/0354636 A1 | 12/2018 | Darnell et al. | |
| 2019/0146508 A1 | 5/2019 | Dean et al. | |
| 2019/0221127 A1 | 7/2019 | Shannon | |
| 2019/0235523 A1 * | 8/2019 | Rozenberg | G06V 10/7715 |
| 2019/0316849 A1 | 10/2019 | Abrego et al. | |
| 2020/0103922 A1 | 4/2020 | Nonami et al. | |
| 2020/0182637 A1 | 6/2020 | Kumar et al. | |
| 2020/0388166 A1 | 12/2020 | Rostamzadeh et al. | |
| 2021/0158157 A1 * | 5/2021 | Ganille | G06N 3/096 |
| 2021/0319709 A1 * | 10/2021 | Rose | G06T 3/4015 |
| 2022/0315242 A1 * | 10/2022 | Liu | G08G 5/74 |
| 2023/0023069 A1 * | 1/2023 | Gariel | B64D 45/04 |
| 2023/0222684 A1 * | 7/2023 | Boggs | G06V 10/24 |
| | | | 382/103 |
| 2023/0282001 A1 * | 9/2023 | Gupta | G06V 20/17 |
| | | | 701/461 |

FOREIGN PATENT DOCUMENTS

| | | |
|---|---|---|
| EP | 0945841 A1 | 9/1999 |
| EP | 2698749 A1 | 2/2014 |
| EP | 3499634 A1 | 6/2019 |
| JP | 2010095246 A | 4/2010 |
| JP | 2013086795 A | 5/2013 |
| WO | WO 2018023556 A1 | 2/2018 |
| WO | WO 2019089677 A1 | 5/2019 |
| WO | WO 2020252024 A1 | 12/2020 |

OTHER PUBLICATIONS

Ajith et al., "Robust Method to Detect and Track the Runway during Aircraft Landing Using Colour segmentation and Runway features," 2019 3rd International Conference on Trends in Electronics and Informatics (ICOEI), 2019, pp. 751-757. (Year: 2019).*

Amit et al., "A Robust Airport Runway Detection Network Based on R-CNN Using Remote Sensing Images," IEEE Aerospace and Electronic Systems Magazine, vol. 36, No. 11, Nov. 1, 2021, pp. 4-20. (Year: 2021).*

Doehler et al., "Robust position estimation using images from an uncalibrated camera," Digital Avionics Systems Conference, 2003. DASC '03, 2003, p. 9.D.2-9.1-7. (Year: 2003).*

CN 112288879 A—machine translation (Year: 2021).*

CN 112904895 A—machine translation (Year: 2021).*

Bennaceur et al., "Passenger-centric urban air mobility: Fairness trade-offs and operational efficiency", Transportation Research: Emerging Technologies, 2021, 29 pages.

Jong, "Optimizing cost effectiveness and flexibility of air taxis: A case study for optimization of air taxi operations", University of Twente, Master's thesis, 2007, 62 pages.

Miao et al., "Data-driven robust taxi dispatch under demand uncertainties", IEEE Transactions on Control Systems Technology 27, No. 1, 2017, 16 pages.

Miao et al., "Taxi dispatch with real-time sensing data in metropolitan areas: A receding horizon control approach", In Proceedings of the ACM/IEEE Sixth International Conference on Cyber-Physical Systems, 2015, 15 pages.

Uber, "Fast-forwarding to a future of on-demand urban air transportation", 2016, 99 pages.

* cited by examiner

SIDESTRIPE IDENTIFICATION, ESTIMATION AND CHARACTERIZATION FOR ARBITRARY RUNWAYS

BACKGROUND

Autonomous vehicle technology is currently under development for a wide range of commercial, transportation and logistical situations. Ridesharing companies are attempting to develop a fleet of taxis without drivers and low-altitude flight vehicles. Retailers in the eCommerce space are developing delivery drones and shipping companies seek the lower transit times that could be a benefit of replacing truck drivers with autonomously operated trucks. There has also been an increase in development efforts in the field of autonomous aviation. In conventional systems, estimation of an aircraft's state during critical stages of flight is done through the fusion of inertial and global navigation satellite system (GNSS) data. Such conventional development efforts struggle to improve the reliability and accuracy of state-estimation.

SUMMARY

Various embodiments of an apparatus, methods, systems and computer program products described herein are directed to an Identification Engine. The Identification Engine identifies a portrayal in image data of at least one side stripe of an aircraft runway at a geographical location. The Identification Engine applies a three-dimensional (3D) map of the geographic location to the portrayal of the at least one side strip in the image data. Based on applying the 3D map, the Identification Engine determines a current position of an aircraft in the 3D map with respect to the aircraft runway at the geographical location.

Various embodiments described herein are a significant improvement over conventional systems in autonomous aviation by utilization of camera dat. Image data provides an information-rich channel through which low-cost and high-quality information can be obtained in order to determine reliable and accurate estimation of the aircraft's state during critical stages of flight.

According to various embodiments, the Identification Engine determines the aircraft's orientation in the 3D map relative to a known geographic location of a side stripe(s) identified as being portrayed in the image data.

In one or more embodiments, the Identification Engine utilizes the determined current position of the aircraft in the 3D map for generating autonomous aircraft data for autonomous control of landing the aircraft on a physical runway that includes a physical instance of the at least one side stripe identified as being portrayed in the image data.

According to various embodiments, the Identification Engine identifies portrayal in the image data of the side stripe(s) of the aircraft runway by continually capturing image data via a camera(s) aboard the aircraft while the aircraft is in flight and/or taxiing along the runway.

In one or more embodiments, the Identification Engine identifies portrayal in the image data of the side stripe(s) of the aircraft runway by implementing a CenterNet deep neural network (DNN) and various image analysis algorithms for histogram equalization, local thresholding, image thinning, image filtering and/or segment/clustering extraction.

According to one or more embodiments, training data utilized to train the Identification Engine includes various type of images of different runways portrayed in various types of flight visibility conditions and/or at different aircraft approach perspectives relative to a view of a corresponding runway.

According to an embodiment, the Identification Engine utilizes output from the DNN and various image analysis algorithms in conjunction with 3D map data of the geographic location (i.e. the current airport) in order to ascertain positions of the aircraft runway side stripes according to a 3D coordinate space.

In one or more embodiments, the Identification Engine determines an orientation of the aircraft in the 3D coordinate space based at least in part on the ascertained positions of the aircraft runway side stripes according to a 3D coordinate space.

In various embodiments, the Identification Engine generates autonomous aviation guidance output that corresponds with a current orientation of the aircraft of the ascertained positions of the aircraft runway side stripes.

Various embodiments herein are not limited to aircraft and can be applied to any type of vehicle.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Figure 1:
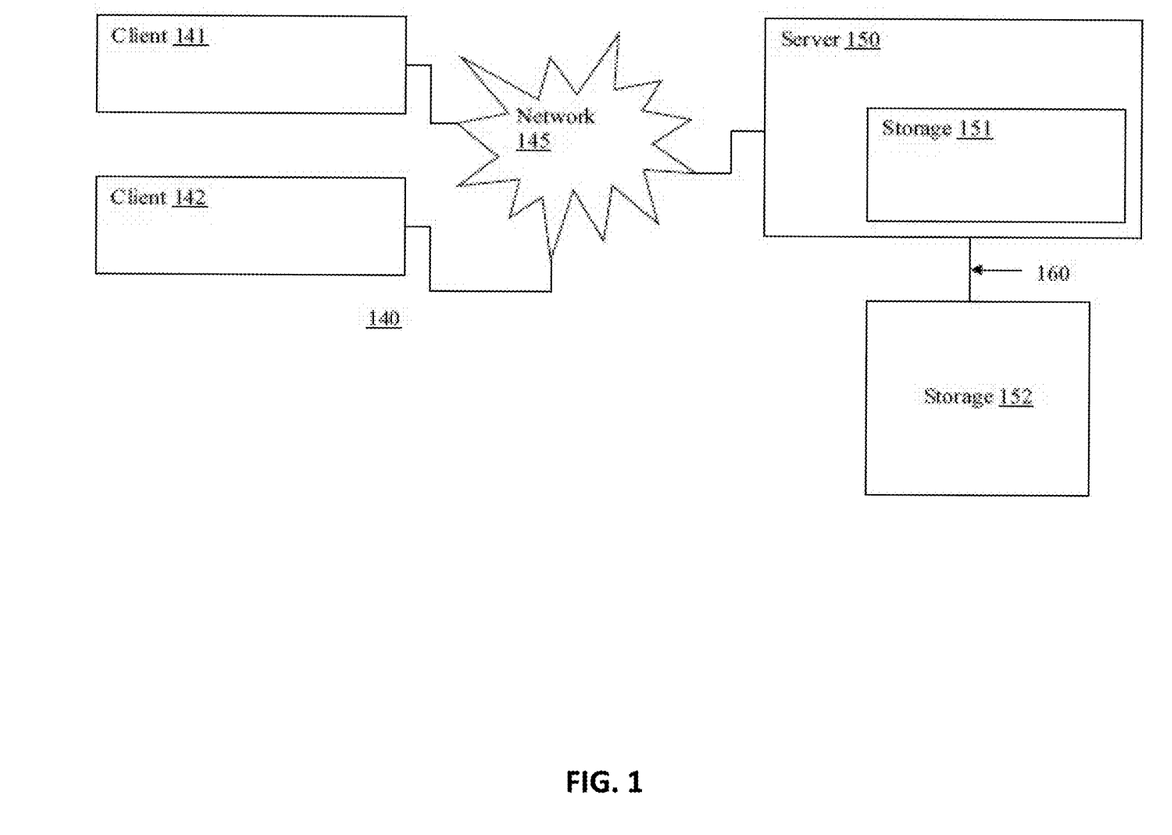
FIG. 1 is a diagram illustrating an exemplary environment in which some embodiments may operate.

A diagram of exemplary network environment in which embodiments may operate is shown in FIG. 1. In the exemplary environment 140, two clients 141, 142 are connected over a network 145 to a server 150 having local storage 151. Clients and servers in this environment may be computers. Server 150 may be configured to handle requests from clients.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151. In another embodiment, the server 150 may respond to requests and store the file with a specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 2:
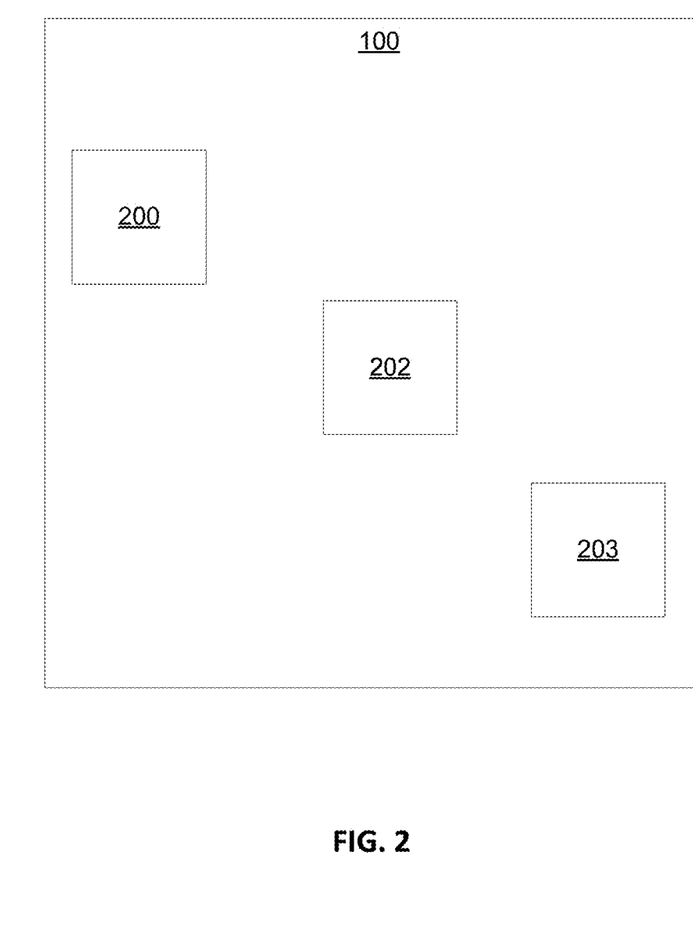
FIG. 2 is a diagram illustrating an exemplary environment in which some embodiments may operate.

FIG. 2 illustrates a block diagram of an example system 100 for an Identification Engine that includes an image analysis module 200, a 3D map application module 202, and an aircraft position determination module 204.

The image analysis module 200 of the system 100 may perform functionality as illustrated in FIGS. 3, 4, 5A and 5B ("FIGS. 3-5B").

The 3D map application module 202 of the system 100 may perform functionality illustrated in FIGS. 3-5B.

The aircraft position determination module 204 of the system 100 may perform functionality illustrated in FIGS. 3-5B.

Figure 3:
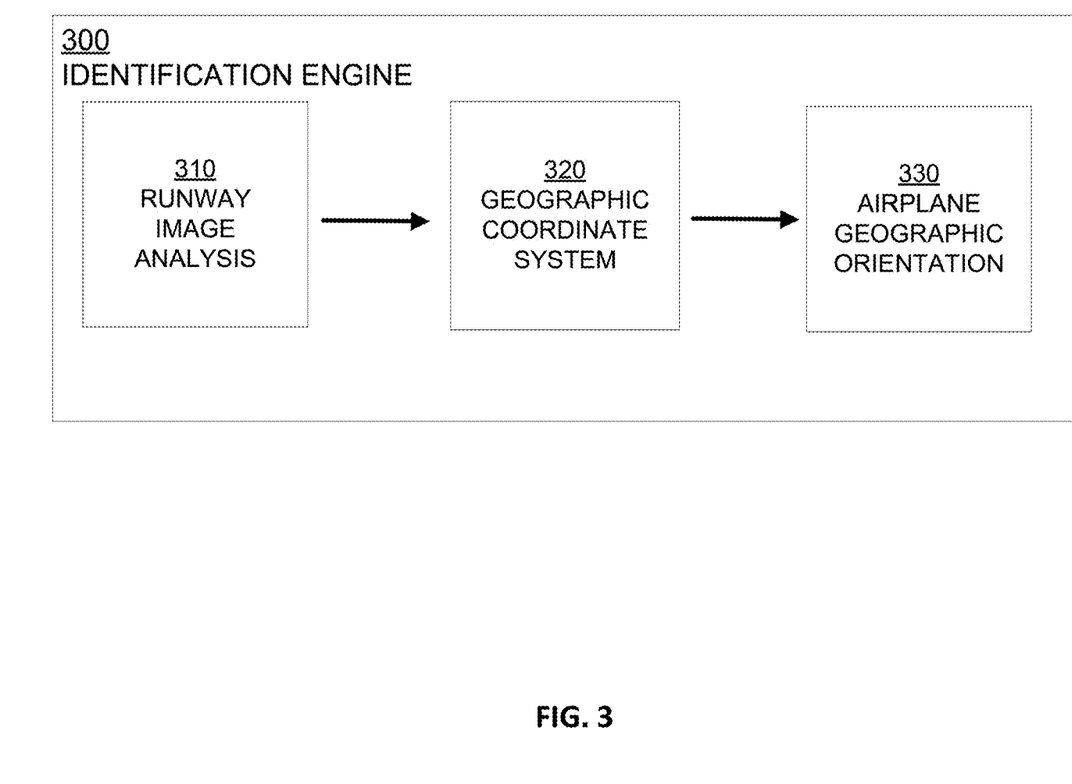
FIG. 3 are each a diagram illustrating an exemplary environment in which some embodiments may operate.

As shown in FIG. 3, the Identification Engine 300 implements runway image analysis 310 to identify the portrayal of a runway's side stripes in image data. The Identification Engine applies a geographic coordinate system 320 to determine the position and orientation of the identified runway side stripes in three-dimensional (3D) space. For example, the geographic coordinate system 320 includes a 3D map (e.g. geographic data) of an airport that an aircraft is currently approaching. Hence, the image data corresponds to the runway(s) of that airport.

The Identification Engine 300 compares the image data from runway image analysis 310 to a 3D map of the airport and/or corresponding runway(s). The Identification Engine 300 determines the aircraft's geographic orientation 302 (i.e. the aircraft's pose based on current orientation and position) in the 3D map relative to the known geographic locations of the runway side stripe(s) detected by the runway image analysis 310. According to various embodiments, the Identification Engine 300 determines an aircraft's pose (i.e. position and orientation) by utilization of two-dimensional (2D) coordinates of features obtained by runway image analysis 310. For example, the 2D coordinates represent features such as endpoints of runway side stripes. Corresponding 3D coordinates are obtained wherein the 3D coordinates map to the actual geographical position(s) of the features represented by the 2D coordinates. In some embodiments, the 3D coordinates may be, as a non-limiting example, based on one or more of longitude, latitude and altitude. In addition, the Identification Engine 300 utilizes camera calibration parameters such as the following non-limiting parameter examples: focal length, lens distortion. In some embodiments, the types of camera calibration parameters may be known or determined prior to a particular flight of an aircraft. In some embodiments, the Identification Engine 300 may implement and execute a Perspective-n-Point algorithm with the 2D coordinates, the 3D coordinates and one or more camera calibration parameters to calculate an aircraft's geographic pose. For example, Perspective-n-Point algorithm may return output in the Identification Engine 300 according to the following equation to obtain R and T: s pi=K [R|T]pw, whereby s is a scale factor, pi is a 2D coordinate in the image, pw is the corresponding 3D coordinate, K is a matrix of camera calibration parameters, R is the desired 3D rotation (i.e. orientation) of the aircraft and T is the desired 3D translation (i.e. position) of the aircraft. It is understood that the variable pi may be 2D coordinates of a particular feature in an image. It is understood that the variable pw is the corresponding 3D coordinates for the variable pi.

The Identification Engine 300 further utilizes real-time data regarding the aircraft such as current altitude, changes in altitude, current speed and/or changes in speed, flight path data and/or expected flight path data. Based on the aircraft's real-time data and continuously determining and updating the aircraft's current orientation and position in the 3D map relative to the known geographic locations of the runway side stripe(s), the Identification Engine 300 can further determine autonomous flight data to direct the aircraft to a safe and accurate landing.

In addition, the Identification Engine 300 may continuously determine and updating the aircraft's current orientation and position after initial landing and while the aircraft is taxiing along the runway. The Identification Engine 300 can also determine autonomous taxiing data to direct the aircraft to travel a path along the runway and to eventually to exit from the runway after the landing.

Figure 4:
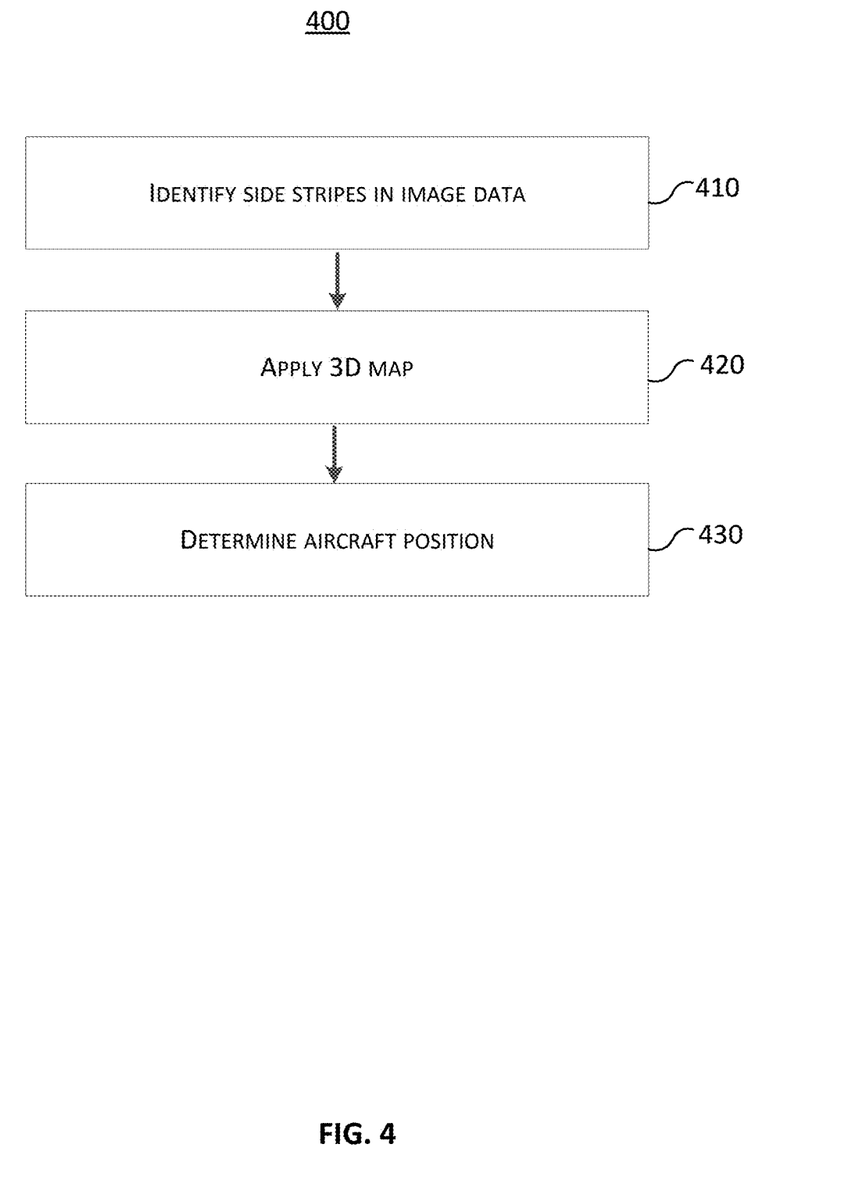
FIG. 4 is a diagram illustrating an exemplary method that may be performed in some embodiments.

As shown in flowchart 400 of FIG. 4, the Identification Engine identifies a portrayal in image data of at least on side stripe of an aircraft runway at a geographical location. (Act 410) In various embodiments, the image data may be captured via one more camera on the aircraft. For example, one or more of the cameras may be infrared cameras.

The Identification Engine applies a three-dimensional (3D) map of the geographic location to the portrayal of the at least one side strip in the image data. (Act 420) In various embodiments, the 3D map of the geographic location may include a small point data set based on two 3D lines that define the start point(s) and the end point(s) of runway side stripes according to a geographic coordinate system.

Based on applying the 3D map, the Identification Engine determines a current position of an aircraft in the 3D map with respect to the aircraft runway at the geographical location. (Act 430) In various embodiments, the Identification Engine determines the aircraft's orientation in the 3D map relative to a known geographic location of the at least one side stripe identified as being portrayed in the image data.

Figure 5A:
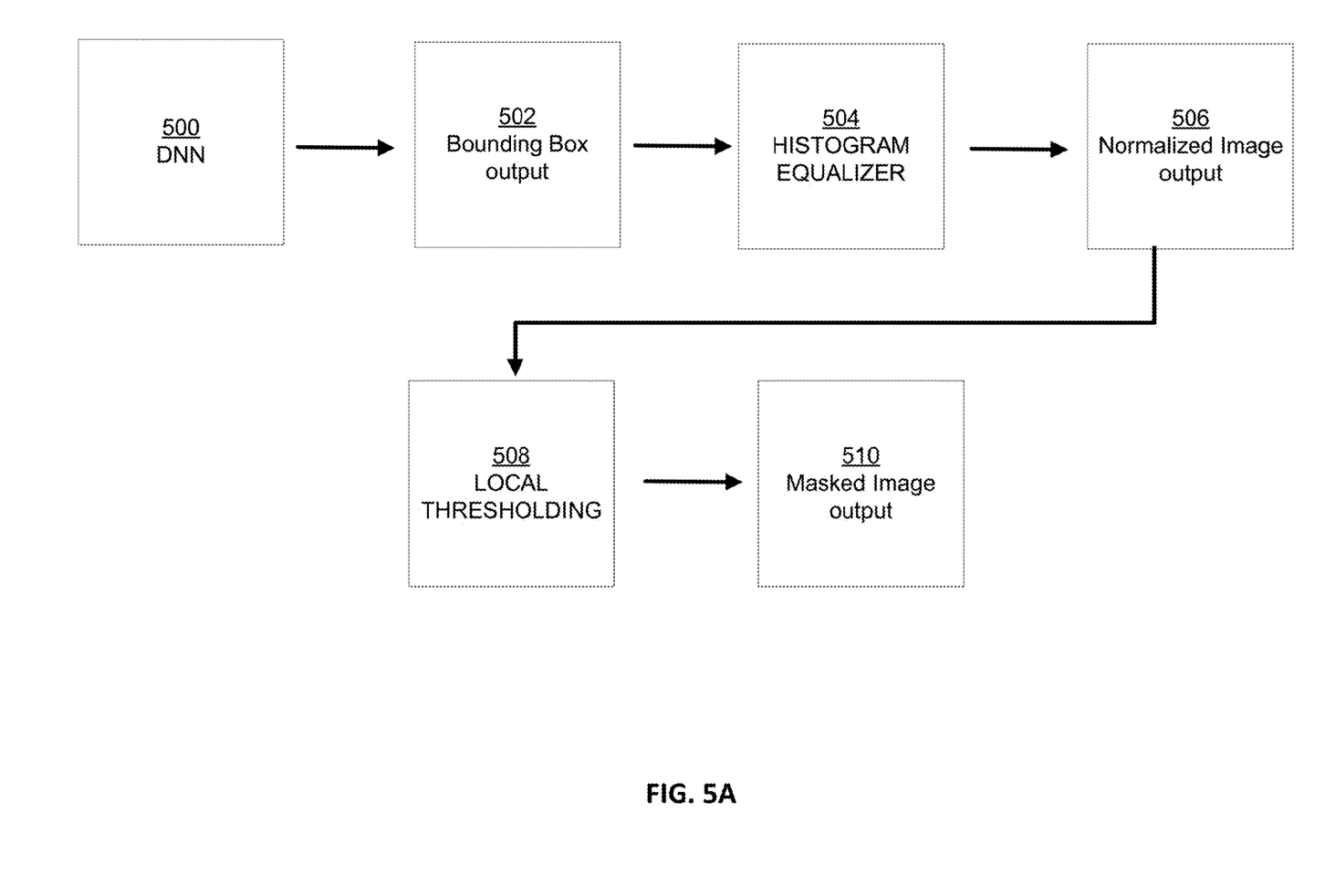
FIGS. 5A and 5B are each a diagram illustrating an exemplary environment in which some embodiments may operate.

As shown in FIG. 5A, image data captured by a camera(s) aboard an aircraft fed into a deep neural network (DNN) 500 by the Identification Engine. The DNN 500 generates output that represents a prediction of a center point (or center pixel) of the image data. The DNN 500 further predicts delta distances amount in terms of height and width as measured from the predicted center point. The DNN 500 utilizes the delta distances to construct a bounding box in the image data that surrounds the predicted center point. For example, the sides of the bounding box are situated in the image data at a delta width distance away from the predicted center point. The top and bottom of the bounding box are situated in the image data at a delta height distance away from the predicted center point. Bounding box output 502 is generated which displays the bounding box in the image data.

The Identification Engine feeds the bounding box output 502 into a histogram equalizer 504. The histogram equalizer 504 rescales the image data of the bounding box output 502. For example, the histogram equalizer 504 rescales the intensity values of the pixels in the image data of the bounding box output 502. According to various embodiments, source image data from a camera(s) may be originally set at various pixel values that correspond to camera settings (such as exposure settings) and/or visibility conditions (such as fog, nighttime, etc.). As a result, various groups of pixels in the source image data, and in turn in the bounding box output 502, may have intensity values that are out of proportion to the intensity values of other groups of pixels. If the bounding box output 502 is, for example, an 8-bit image, then the histogram equalizer 504 scales the intensity values of the all the pixels according to 256 values (0-255). The histogram equalizer 504 thereby generates normalized image output 506.

The Identification Engine applies local thresholding 508 to the normalized image output 506. In various embodiments, during local thresholding 508, the Identification Engine accesses one or more rows of pixels in the normalized image output 506. For example, the Identification Engine may access each row of pixels in the normalized image output 506. The Identification Engine evaluates each pixel (in a pixel row) on a column-by-column basis. The Identification Engine evaluates the intensity values of the pixels relative to neighboring pixels in order to identify when large differences between pixel intensity values occur.

According to various embodiments, during local thresholding 508, the Identification Engine may evaluate a group of pixels in adjacent columns. These pixels may correspond to image data that portrays a portion of a side strip of a runway. Hence, since side strips tend to be painted in bright colors (such as white or yellow), the pixels will each have intensity values in the normalized image output 506 that fall within a particular intensity value range. As such, the relative magnitude of change of intensity values between these pixels will be relatively small.

However, portrayal of a portion of the side stripe of the runway in the normalized image output 506 will inevitably cease when a pixel (that corresponds to the side stripe of the runway) is adjacent to a pixel that corresponds with a non-painted portion of the runway itself. Here, the relative magnitude of change of intensity values between these pixels will be relatively large.

The Identification Engine compares the relative magnitude of changes of neighboring against a threshold. When a comparison exceeds the threshold, the Identification Engine detects that a visible and relevant change in a visual characteristic of the runway—as portrayed in the normalized image output 506—is detected. The Identification Engine identifies one or more neighboring pixels that correspond to low magnitude of changes relative to each other and assigns the same pixel values to those pixels. For example, the Identification Engine assigns a pixel value for the color white to all neighboring pixels—in a respective row of pixels—that that correspond to low magnitude of changes relative to each other.

The Identification Engine identifies one or more neighboring pixels that correspond to a large magnitude of change relative to each other and assigns different pixel values to those pixels. For example, a first pixel value for the color white will be assigned to the pixel with the higher intensity value and a second pixel value for the color black will be assigned to the pixel with the lower intensity value. For example, if the neighboring pixels that correspond to the large magnitude of change includes a first pixel from the painted white side stripe of the runway and a second pixel for an unpainted darker portion of the runway, the first pixel is assigned the white color pixel value and the second pixel is assigned the black color pixel value. The Identification Engine cycles through all the rows of pixels in the normalized image output 506 and reassigns pixel values to all pixels in this manner. The resulting output of the local thresholding 508 is masked image output 510.

Figure 5B:
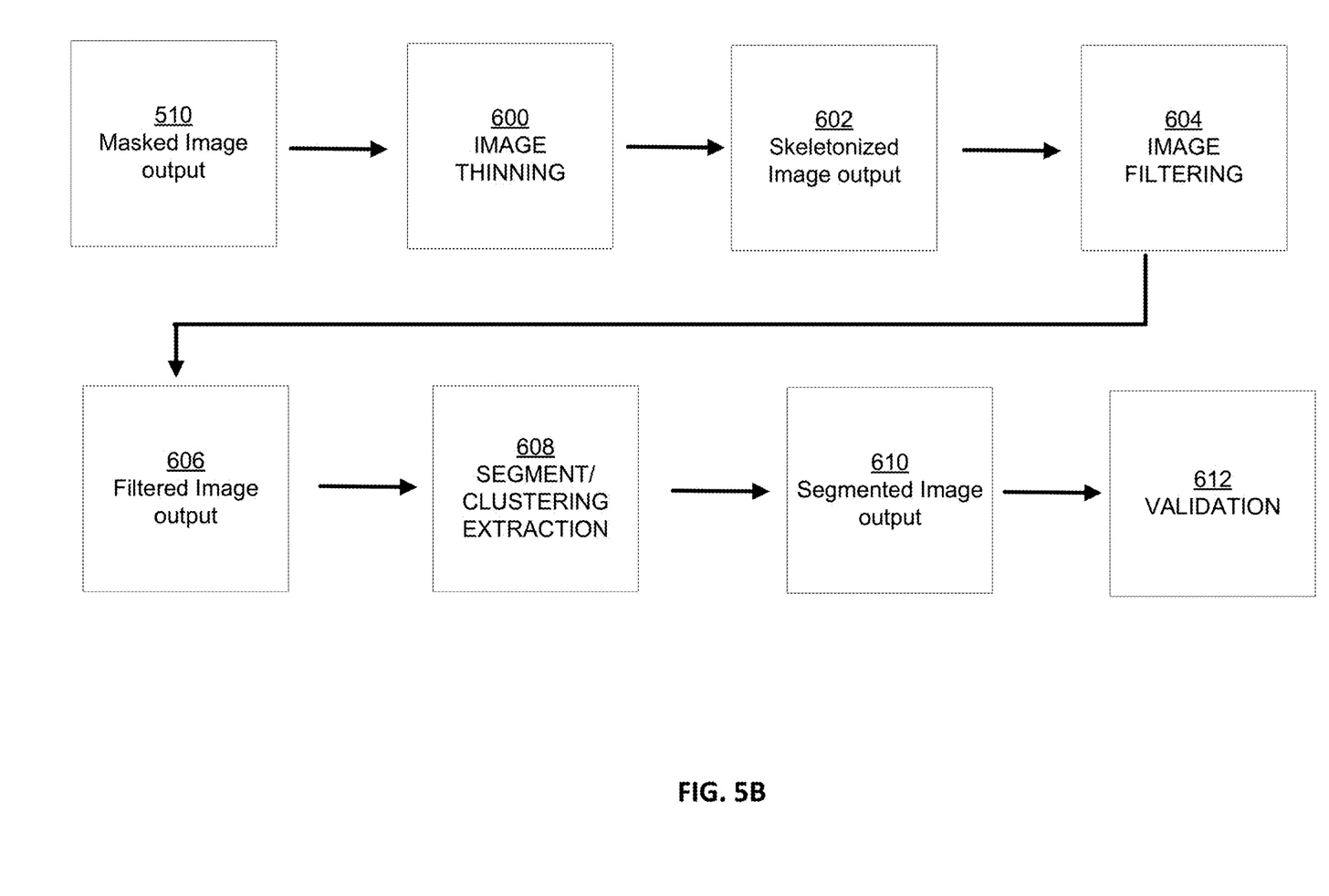

As shown in FIG. 5B, the Identification Engine applies image thinning 600 to the masked image output 510. For example, the Identification Engine applies one or more morphological operations to the masked image output 501 to generate skeletonized image output 602. In various embodiments, the Identification Engine applies a continuous line filter algorithm to the masked image output 510 in order to generate the skeletonized image output 602.

The Identification Engine applies image filtering 604 to the skeletonized image output 602. In various embodiments, the Identification Engine applies a kernel on a pixel-by-pixel basis to the skeletonized image output 602. In some embodiments, the kernel is a matrix of values that is to be applied to each pixel in the skeletonized image output 602. That is, the kernel may be a set of convolutional operators that are to be applied to each pixel of the skeletonized image output 602. Image filtering 604 generates filtered image output 606. As a result of applying the kernel to each pixel of the skeletonized image output 602, the filter image output 606 constitutes an entirely new image whereby various pixels (or pixel areas) will be portrayed and other pixels (or pixel areas) may be minimized in their visual effect. According to various embodiments, the filter image output 606 may be a feature image that portrays all of the relevant image features of the scene portrayed in the skeletonized image output 602. The relevant image features of the filter image output 606 would be determined as a result of applying the kernel to the skeletonized image output 602.

The Identification Engine applies segment/cluster extraction 606 to the filter image output 606. Segment/cluster extraction 606 seeks to translate the filter image output 606 from the raster space to the vector space. During segment/cluster extraction 606, the Identification Engine identifies components in the filter image output 606. For example, such components may be a connected set of features such as, white pixels connected together (i.e. adjacent to each other) to form a curved line or a straight line. The Identification Engine applies a predefined distance threshold and a predefined strict threshold to each identified component. Those components that do not satisfy either of the thresholds are not deemed as relevant. That is, the Identification Engine discards components of the filter image output 606 that may be too short in comparison with the distance threshold and/or too curvy in comparison with the strict threshold. The remaining components that satisfy the thresholds are those components that are relatively long components and not curvy. The segment/cluster extraction 606 generates segmented image output 608 that includes the remaining components.

The Identification Engine further identifies those remaining components with a positive gradient and those remaining components with a negative gradient. For example, two remaining components—one with a positive gradient and the other with a negative gradient—are candidates for being identified as side stripes of a runway because the two components inevitably will be portrayed as being tilted towards each other due to their opposite gradients (i.e. positive and negative gradients).

The Identification Engine computes an intersection point, via projective geometry, within the segmented image output 608 for any pair of remaining components with respective opposing gradients. For a pair of components with opposing gradients that are based on image data from the side stripes of a runway, the computed intersection point will be located on the horizon line of the scene upon which the segmented image output 608 is based.

Upon detecting that a computed intersection point is with a proximate range to the horizon line, the Identification Engine identifies the corresponding pair of components with opposing gradients as being based on pixels that represent the side stripes of the runway.

Figure 6A:
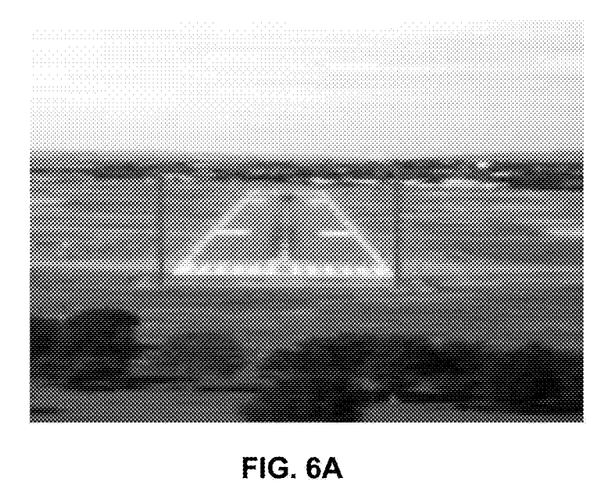
FIGS. 6A and 6B are each a diagram illustrating an exemplary image output generated by an exemplary environment in which some embodiments may operate
Figure 6B:
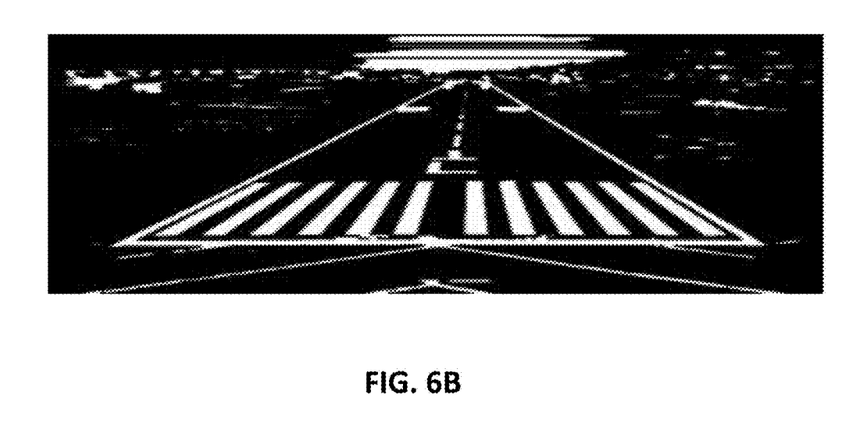
Figure 7:
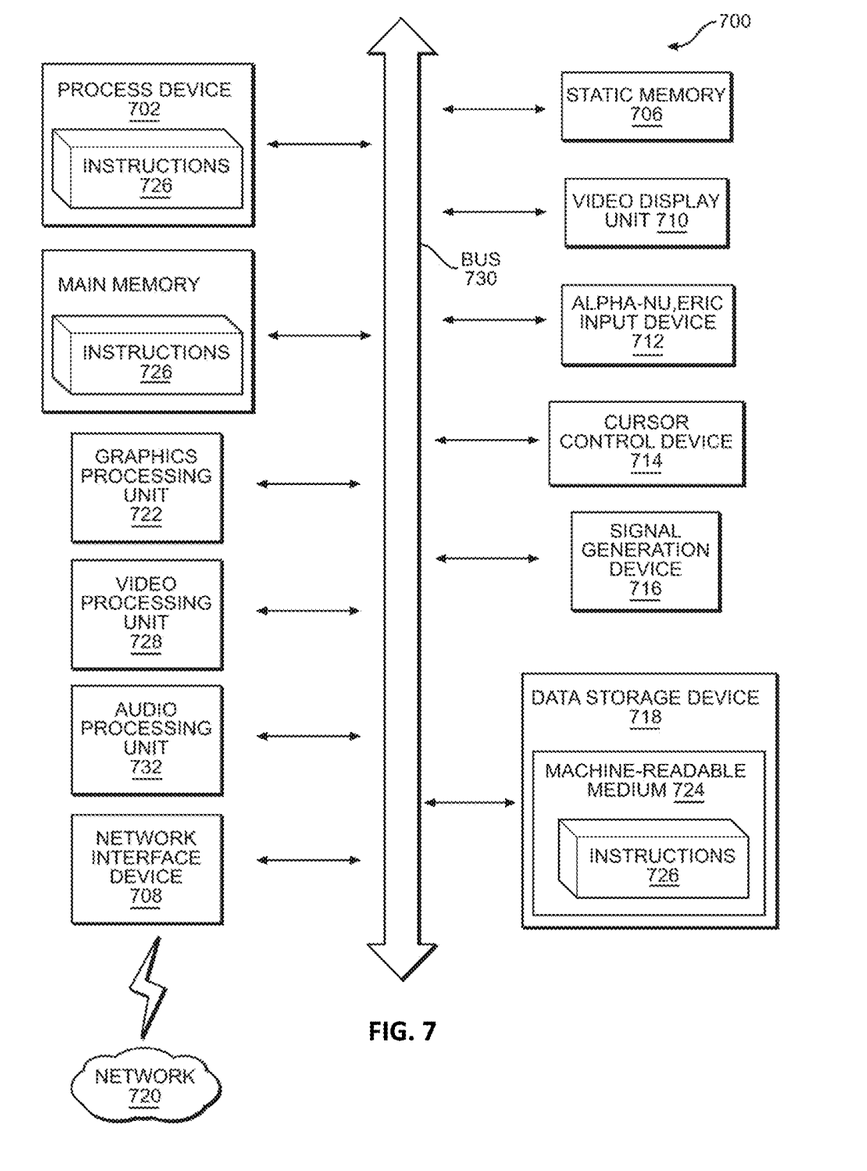
FIG. 7 is a diagram illustrating an exemplary environment in which some embodiments may operate.

FIG. 6A shows an example of a bounding box output.
FIG. 6B shows an example of a masked image output.
FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:
    capturing two-dimensional (2D) image data via one or more cameras of an aircraft;
    identifying a portrayal in image data of at least one side stripe of an aircraft runway at a geographical location;
    predicting a center point of the 2D image data;
    determining respective placement of edges in the 2D image data of a bounding box based on the predicted center point;
    applying a three-dimensional (3D) map of the geographic location to the portrayal of the at least one side stripe in the image data;
    based on applying the 3D map, determining a current position of the aircraft in the 3D map with respect to the aircraft runway at the geographical location; and
    generating bounding box output data that includes the placement of edges in the 2D image data.

2. The computer-implemented method of claim 1, wherein determining a current position of an aircraft in the 3D map with respect to the aircraft runway at the geographical location comprises:
    determining the aircraft's orientation in the 3D map relative to a known geographic location of the at least one side stripe identified as being portrayed in the image data.

3. The computer-implemented method of claim 1, further comprising:
    utilizing the determined current position of the aircraft in the 3D map for generating autonomous aircraft data for autonomous control of landing the aircraft on a physical runway that includes a physical instance of the at least one side stripe identified as being portrayed in the image data.

4. The computer-implemented method of claim 1, wherein identifying a portrayal in image data of at least one side stripe of an aircraft runway comprises:
    generating the bounding box from the 2D image data, the bounding box including the portrayal of the at least one side stripe of the aircraft runway.

5. The computer-implemented method of claim 4, wherein generating a bounding box from the image data comprises:
   feeding the 2D image data into a neural network, the neural network trained according to image training data, the image training data comprising respective different types of runway images; and
   receiving neural network output predicting the center point of the 2D image data.

6. The computer-implemented method of claim 5, wherein the respective different types of runway images comprise at least one or more of:
   i. images of different runways;
   ii. images of runways in different visibility conditions;
   iii. images of runways from different altitude perspectives; and
   iv. infrared images of runway.

7. The computer-implemented method of claim 5, further comprising:
   generating normalized image output by applying histogram equalization to the bounding box output data; and
   generating masked image output by applying local thresholding to each pixel in each row of pixels in the normalized image output.

8. The computer-implemented method of claim 7, further comprising:
   generating skeletonized image output by applying image thinning to the masked image output;
   generating filtered image output by applying image filtering to the skeletonized image output; and
   generating segmented image output by applying segment/clustering extraction to the filtered image output.

9. A system comprising one or more processors, and a non-transitory computer-readable medium including one or more sequences of instructions that, when executed by the one or more processors, cause the system to perform operations comprising:
   capturing two-dimensional (2D) image data via one or more cameras of an aircraft;
   identifying a portrayal in image data of at least one side stripe of an aircraft runway at a geographical location;
   predicting a center point of the 2D image data;
   determining respective placement of edges in the 2D image data of a bounding box based on the predicted center point;
   applying a three-dimensional (3D) map of the geographic location to the portrayal of the at least one side stripe in the image data;
   based on applying the 3D map, determining a current position of the aircraft in the 3D map with respect to the aircraft runway at the geographical location; and
   generating bounding box output data that includes the placement of edges in the 2D image data.

10. The system of claim 9, wherein determining a current position of an aircraft in the 3D map with respect to the aircraft runway at the geographical location comprises:
    determining the aircraft's orientation in the 3D map relative to a known geographic location of the at least one side stripe identified as being portrayed in the image data.

11. The system of claim 9, further comprising:
    utilizing the determined current position of the aircraft in the 3D map for generating autonomous aircraft data for autonomous control of landing the aircraft on a physical runway that includes a physical instance of the at least one side stripe identified as being portrayed in the image data.

12. The system of claim 9, wherein identifying a portrayal in image data of at least one side stripe of an aircraft runway comprises:
    generating the bounding box from the 2D image data, the bounding box including the portrayal of the at least one side stripe of the aircraft runway.

13. The system of claim 12, wherein generating a bounding box from the image data comprises:
    feeding the 2D image data into a neural network, the neural network trained according to image training data, the image training data comprising respective different types of runway images; and
    receiving neural network output predicting a center point of the 2D image data.

14. The system of claim 13, wherein the respective different types of runway images comprise at least one or more of:
    i. images of different runways;
    ii. images of runways in different visibility conditions;
    iii. images of runways from different altitude perspectives; and
    iv. infrared images of runway.

15. The system of claim 13, further comprising:
    generating normalized image output by applying histogram equalization to the bounding box output data; and
    generating masked image output by applying local thresholding to each pixel in each row of pixels in the normalized image output.

16. The system of claim 15, further comprising:
    generating skeletonized image output by applying image thinning to the masked image output;
    generating filtered image output by applying image filtering to the skeletonized image output; and
    generating segmented image output by applying segment/clustering extraction to the filtered image output.

17. A computer program product comprising a non-transitory computer-readable medium having a computer-readable program code embodied therein to be executed by one or more processors, the program code including instructions to:
    capturing two-dimensional (2D) image data via one or more cameras of an aircraft;
    identifying a portrayal in image data of at least one side stripe of an aircraft runway at a geographical location;
    predicting a center point of the 2D image data;
    determining respective placement of edges in the 2D image data of a bounding box based on the predicted center point;
    applying a three-dimensional (3D) map of the geographic location to the portrayal of the at least one side stripe in the image data;
    based on applying the 3D map, determining a current position of the aircraft in the 3D map with respect to the aircraft runway at the geographical location; and
    generating bounding box output data that includes the placement of edges in the 2D image data.

18. The computer program product of claim 17, wherein determining a current position of an aircraft in the 3D map with respect to the aircraft runway at the geographical location comprises:
    determining the aircraft's orientation in the 3D map relative to a known geographic location of the at least one side stripe identified as being portrayed in the image data.

19. The computer program product of claim 17, further comprising:

utilizing the determined current position of the aircraft in the 3D map for generating autonomous aircraft data for autonomous control of landing the aircraft on a physical runway that includes a physical instance of the at least one side stripe identified as being portrayed in the image data.

20. The computer program product of claim 17, wherein identifying a portrayal in image data of at least one side stripe of an aircraft runway comprises:

capturing two-dimensional (2D) image data via one or more cameras of the aircraft; and generating the bounding box from the 2D image data, the bounding box including the portrayal of the at least one side stripe of the aircraft runway;

feeding the 2D image data into a neural network, the neural network trained according to image training data, the image training data comprising respective different types of runway images, wherein the respective different types of runway images comprise at least one or more of:

images of different runways, images of runways in different visibility conditions, images of runways from different altitude perspectives and infrared images of runway;

receiving neural network output predicting a center point of the 2D image data;

generating normalized image output by applying histogram equalization to the bounding box output data;

generating masked image output by applying local thresholding to each pixel in each row of pixels in the normalized image output;

generating skeletonized image output by applying image thinning to the masked image output;

generating filtered image output by applying image filtering to the skeletonized image output; and generating segmented image output by applying segment/clustering extraction to the filtered image output.

* * * * *